United States Patent [19]

Huang

[11] Patent Number: 5,584,482
[45] Date of Patent: Dec. 17, 1996

[54] SLEEVE-TYPE GOLF CLUB GRIP

[76] Inventor: Ben Huang, 19472 Woodlands La., Huntington Beach, Calif. 92648

[21] Appl. No.: 507,575

[22] Filed: Jul. 26, 1995

Related U.S. Application Data

[63] Continuation-in-part of Ser. No. 421,376, Apr. 12, 1995, Pat. No. 5,571,051.

[51] Int. Cl.$^6$ .................................................. A63B 49/00
[52] U.S. Cl. ............................ 273/75; 273/73 R; 473/301
[58] Field of Search ................................ 273/81 R, 81 B, 273/81.5, 73 J, 75, 165

[56] References Cited

U.S. PATENT DOCUMENTS

| | | |
|---|---|---|
| 1,441,986 | 1/1923 | Lard . |
| 1,968,064 | 7/1934 | Young . |
| 2,050,176 | 8/1936 | Hammerich . |
| 2,177,143 | 10/1939 | Lamkin . |
| 2,200,626 | 5/1940 | Lamkin . |
| 2,772,090 | 11/1956 | Brandon . |
| 3,078,097 | 2/1963 | Mitchell . |
| 3,271,031 | 9/1966 | Mitchell . |
| 4,373,718 | 2/1983 | Schmidt . |
| 5,234,740 | 8/1993 | Reeves et al. . |
| 5,397,123 | 3/1995 | Huang ................................. 273/73 J |
| 5,435,549 | 7/1995 | Chen ........................................ 273/75 |

FOREIGN PATENT DOCUMENTS

566538  2/1924  France ................................. 273/72 K

Primary Examiner—V. Millin
Assistant Examiner—Charles W. Anderson
Attorney, Agent, or Firm—Fulwider Patton Lee & Utecht, LLP

[57] ABSTRACT

A grip for a golf club shaft defined by a resilient, cushioned strip that is spirally wrapped about a split resilient sleeve which has been slipped over and adhered to the shaft of the golf club. The grip may be substituted for the original conventional rubber grip or, alternatively, may be installed as the original grip on a new golf club shaft.

9 Claims, 8 Drawing Sheets

SLEEVE-TYPE GOLF CLUB GRIP

This is a continuation-in-part of application Ser. No. 08/421,376 filed on Apr. 12, 1995 now U.S. Pat. No. 5,571,052.

BACKGROUND OF THE INVENTION

1. Field of the Invention

The present invention relates to an improved golf club grip which may also be utilized with other devices employing shafts or handles.

2. Description of the Prior Art

Conventional golf club grips are molded from a single piece of rubber or synthetic plastic. When it is necessary to replace the original grip, such replacement is difficult and cannot be accomplished by the average golfer. Accordingly, the golfer is required to leave his golf club at a golf shop for several days for application of the replacement grip. Another disadvantage of conventional golf club grips is their tendency to become slippery when dampened, as for example, when playing under rainy conditions or by contact with perspiration formed on the golfer's hands. Slippery contact of a golfer's hands with a golf club grip reduces his feel of the golf club. Most conventional golf club grips are formed with a longitudinal profile having constant straight slope or taper extending downwardly from the top of the golf club shaft toward the head of the club. This constant straight slope or taper, however, does not provide the optimum control of the club for all golfers. It is therefore desirable to be able to vary the longitudinal profile of a golf club grip to meet the desires of any particular golfer, i.e., a person with small hands usually obtains better results with a grip of reduced diameter as compared to a person with large hands. It is also desirable to be able to vary the horizontal profile of the grip of a putter to provide better feel of such club.

SUMMARY OF THE INVENTION

The applicant has developed an improved golf club grip designed to solve the above set forth problems inherent to conventional golf club grips. Specifically, the golf club grip of the present invention may be readily applied by a golfer thereby eliminating the delay and cost involved with replacing a conventional golf club grip. The golf club grip of the present invention also enhances the player's grip on a golf club by providing increased tackiness between the player's hands and the golf club grip. The golf club grip of the present invention enhances the player's feel and touch during play, thereby eliminating the need to wear a glove which is needed to protect against abrasion of a golfer's hand when using a conventional golf club grip and also to stay tacky when wet. Additionally, the golf club grip of the present invention permits the longitudinal and/or horizontal profile of the grip to assume a desired configuration so as to provide maximum comfort and enhanced control over the golf club during play. The golf club grip of the present invention is preferably formed of a synthetic polyurethane material that is readily compressible when gripped by a golfer thereby increasing his touch over the golf club, absorb more vibration and shock, and also reducing fatigue. The grip of the present invention is lighter in weight than conventional rubber grips, for that more of the total golf club weight in distributal to the golf club head thereby increasing club head speed.

The preferred form of golf club grip embodying the present invention utilizes an elongated resilient strip comprising a layer of a textile, such as felt, bonded to a layer of polyurethane. The felt layer is adhered to and provides strength to the polyurethane layer. The polyurethane layer is of closed pore construction which provides a cushioned grip and enhanced tackiness to the golfer's hand. The strip is spirally wrapped about a resilient sleeve which has been slipped over and adhered to the grip-receiving upper portion of a golf club shaft by means of a double-sided adhesive carrier. Such sleeve may vary in profile along its longitudinal axis so that, when the strip is wrapped about the sleeve, the longitudinal profile of the sleeve and grip may, if desired, conform to a desired configuration different than the longitudinal profile of the original conventional grip and shaft. The underside of the width of the strip which abuts the golf club shaft is provided with an adhesive that is originally covered with a protective quick-release tape. The tape is peeled off the adhesive and the strip is then spirally wrapped about the golf club shaft with the edges of the tape in tight abutment so as to provide a smooth contour. This arrangement provides an improved securement of the grip to the golf club shaft, with such securement increasing in use the tighter the grip is grasped by the golfer. When applied to a putter a grip embodying the present invention affords a desired horizontal configuration to provide optimum control over the putter.

DETAILED DESCRIPTION OF THE DRAWINGS

Figure 1:
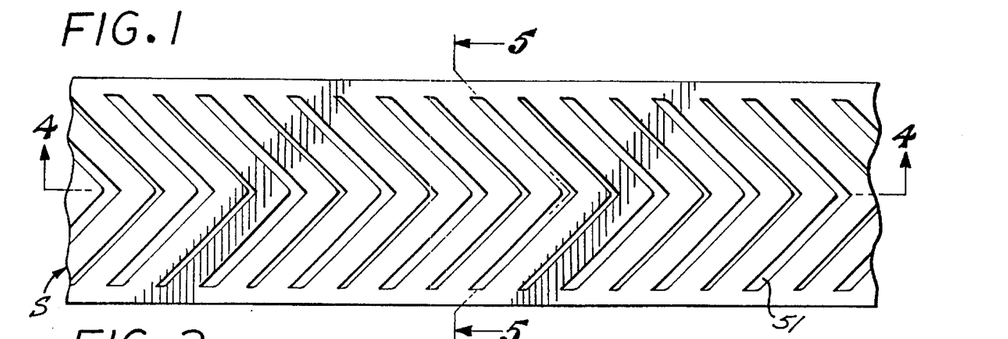
FIG. 1 is a broken top view showing an elongated felt and polyurethane strip having treads utilized in a preferred form of golf club grip embodying the present invention.
Figure 31:
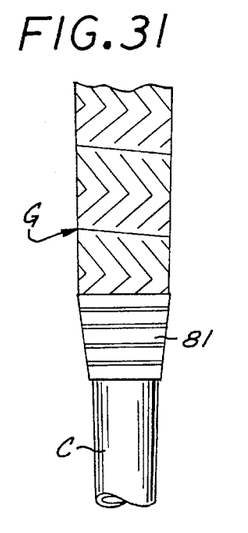
FIG. 31 is a broken side elevational view showing the rubber ferrule in place.
Figure 32:
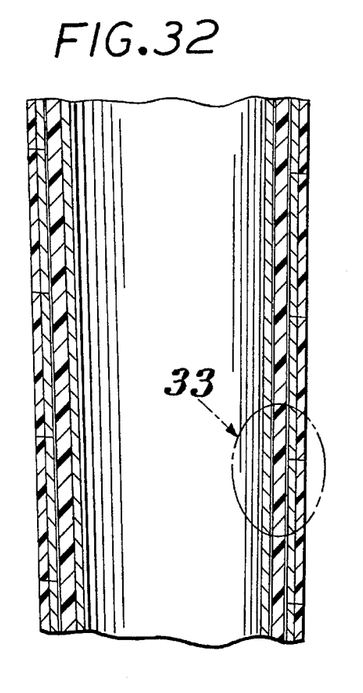
FIG. 32 is a broken side sectional view of the golf club grip mounted on a golf club shaft.
Figure 33:
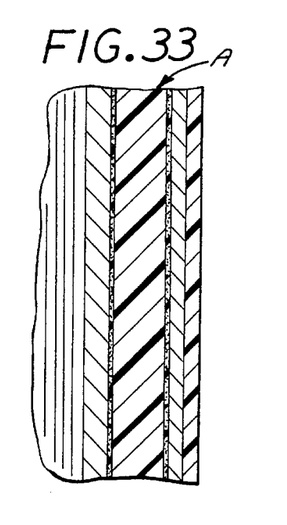
FIG. 33 is a vertical sectional view in enlarged scale of the encircled area designated 33 in FIG. 32.

Referring to the drawings, an elongated resilient strip S utilized to provide a preferred form of golf club grip of the present invention is shown in FIG. 1. Such strip S is adapted to be applied to the upper portion of the shaft C of a conventional golf club to provide an improved golf club grip G. The resilient elongated strip S includes an open-pored textile layer, generally designated 40, the upper surface of which is bonded to the lower surface of a polyurethane layer, generally designated 44. The resulting elongated strip S is spirally wrapped about a sleeve SL to define golf club grip G (FIGS. 28 and 31) embodying the present invention.

Figures 2, 3:
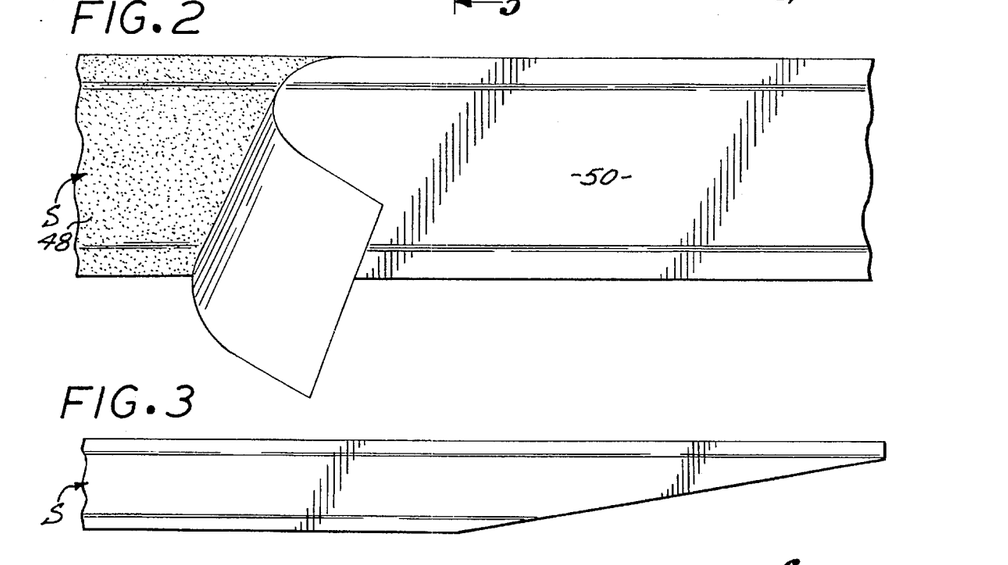
FIG. 2 is a broken view of the underside of said strip.
FIG. 3 is a broken side elevational View showing one end of the strip of FIG. 2.
Figure 4:
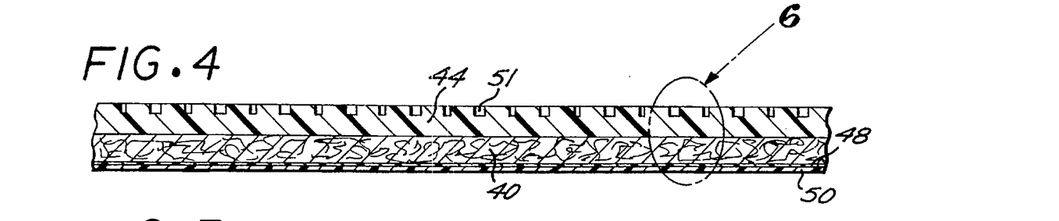
FIG. 4 is a side elevational view taken in enlarged scale along line 4—4 of FIG. 1.
Figure 5:
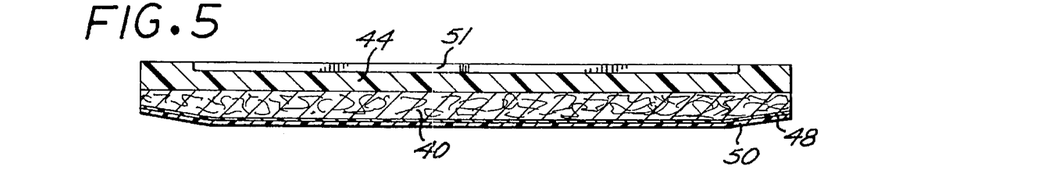
FIG. 5 is a cross-sectional view taken in enlarged scale along line 5—5 of FIG. 1.
Figure 6:
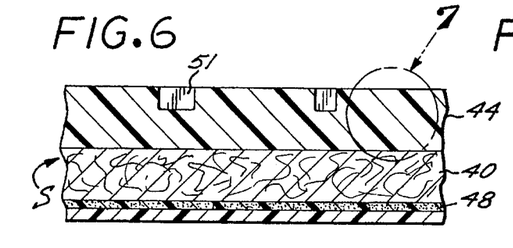
FIG. 6 is an enlarged sectional view of the encircled area designated 6 in FIG. 4.
Figure 7:
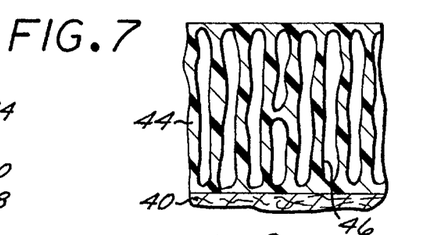
FIG. 7 is a further enlarged sectional view of the encircled area designated 7 in FIG. 6, showing the construction of the polyurethane layer of the strip.

More particularly, the textile layer 40 of resilient strip S is formed of a suitable open-pored material, such as felt, and has its upper surface bonded to the lower surface of polyurethane layer 44. As indicated in FIGS. 6 and 7, the polyurethane layer 44 is formed with closed pores 46 which extend vertically, i.e., generally normal to the longitudinal axis of the strip S. The polyurethane layer 44 may be fabricated in a conventional manner by coating one side of a felt strip with a solution of polyurethane, e.g., polyester or polyether, dissolved in dimethyl formaide (DMF), immersing the coated strip in water baths to displace the DMF and to cause the urethane to coagulate, and finally driving off the water by the application of water and heat. In this manner, the closed pores 46 are formed, while the underside of the polyurethane strip is bonded to the upper surface of the felt layer. The underside of the felt layer 40 is provided with a conventional adhesive 48 which is originally covered with a protective quick-release tape 50, as shown in FIG. 2. To apply the strip to the sleeves of FIGS. 14–22, the protective tape 50 is stripped off the adhesive 48 when the strip of bonded-together polyurethane and felt is to be wrapped about the sleeve SL. The layer of polyurethane 44 provides a cushioned grasp of the player's hands on the shaft C and also enhances the player's grip by providing increased tackiness between the player's hands and the golf club grip, as compared to conventional golf club grips. The felt layer 40 provides strength to the polyurethane layer 44 and also serves as a means for attaching the bonded-together polyurethane and felt strip to sleeve SL.

Figures 8, 9, 10, 11:
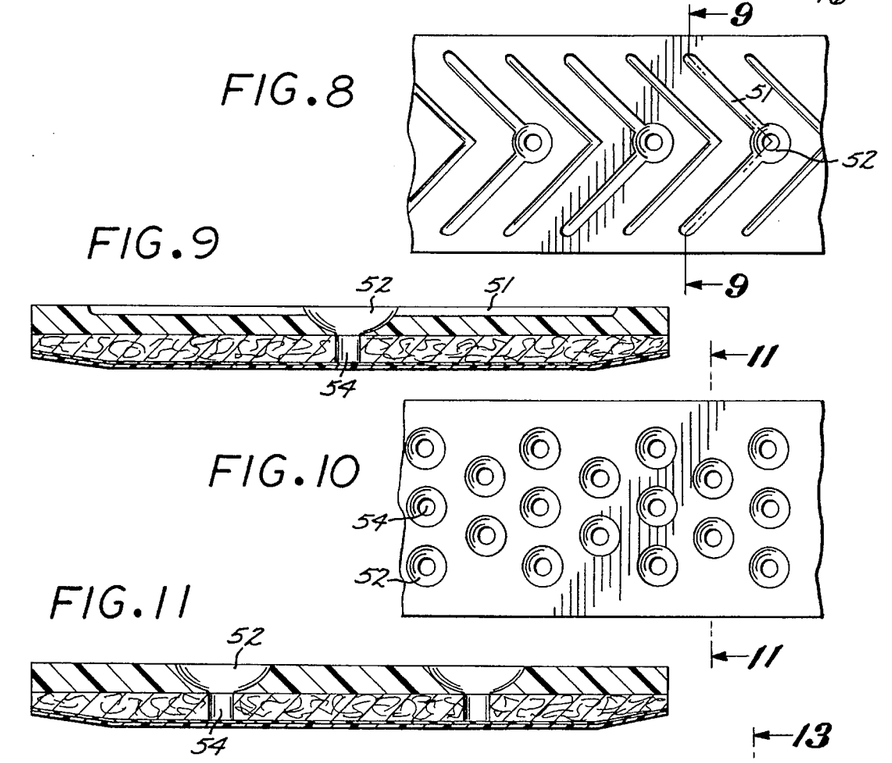
FIG. 8 is a broken top view of a strip similar to the strip of FIG. 1, but additionally formed with perforations and dimples as well as with treads.
FIG. 9 is a vertical sectional view taken in enlarged scale along 9—9 of FIG. 8.
FIG. 10 is a broken top view of a strip formed with perforations and dimples.
FIG. 11 is a vertical sectional view taken in enlarged scale along line 11 of FIG. 10.

Referring now to FIGS. 1–5, the outer surface of the polyurethane layer 44 may be formed over its upper portion with a plurality of chevron-shaped treads 51 arranged in a herringbone pattern. Preferably, these treads intersect dimples 52 as shown in FIGS. 8 and 9 formed in polyurethane layer 44. The dimples 52 intersect perforations 54 formed through the felt layer 40. Treads 50 channel dampness into the dimples and perforations to further reduce slippage of the golfer's hand on the grip G. Treads 50 also increase the frictional contact of the golfer's hand relative to the grip. The perspiration channeling function of the treads is enhanced by connecting the converging portions of such treads with the dimples and hence the perforations. Preferably, the angles between the longitudinal center-line of grip G and the facing edges of treads 50 will approximate 45°–50°.

Figures 12, 13:
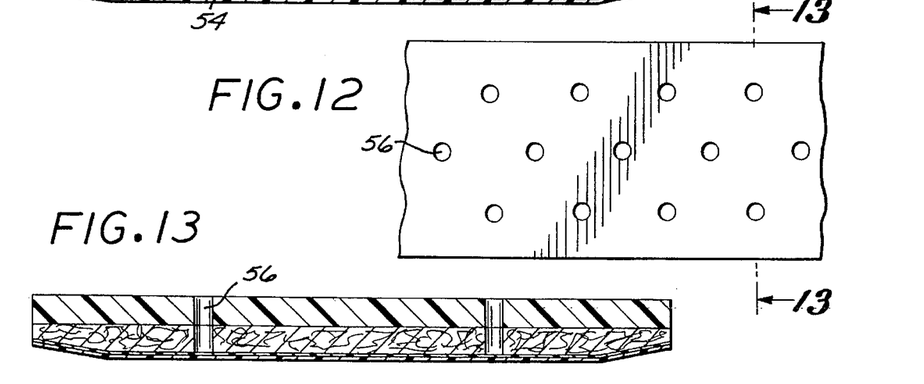
FIG. 12 is a broken top view of a strip formed solely with perforations.
FIG. 13 is a vertical sectional view taken in further enlarged scale of line 13—13 of FIG. 12.
Figures 14, 15:
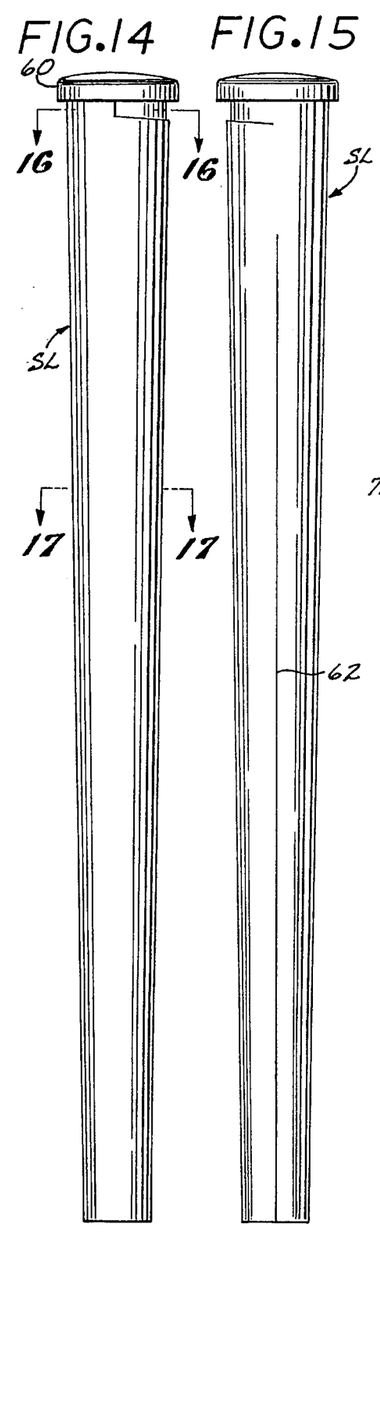
FIG. 14 is a side elevational view showing a resilient sleeve element of a preferred form of golf club grip embodying the present invention.
FIG. 15 is a side elevational view of the side of the sleeve opposite that shown in FIG. 14.

It is also possible to increase the grasp of the golfer's hands to grip G by providing the polyurethane layer 44 solely with a plurality of the dimples 52 over its surface, which coaxially intersect the perforations 54, as shown in FIGS. 10 and 11. Alternatively, the strip S may be formed solely with perforations 56, as shown in FIGS. 12 and 13, which extend through the felt and polyurethane layers.

It has been found that when the grip G is grasped by the golfer with the palm and fingers of the golfer's hand covering the dimples 52, air is first pumped inwardly through vertical passages formed by the dimples and perforations 54 and then into the felt layer 40. When the golfer relaxes his grasp and uncovers the dimples air will be sucked back through the dimples and perforations to achieve "breathing" of air by the grip. The felt layer permits movement of the air inwardly and outwardly relative to the grip because of its porosity. The interchange of the air as it is pumped through the grip serves to evaporate dampness which can accumulate on the exterior surface of the polyurethane layer when the golfer is playing under rainy conditions. Such interchange of air will also serve to evaporate perspiration which would normally accumulate on the exterior surface of the polyurethane layer. Accordingly, a golfer maintains a better hold on the golf club grip than is true with previously known grips, and his control over the golf club is enhanced even under adverse conditions. It has been determined that good results are obtained where a diameter of about one-eighth inch is utilized for the dimples at the intersection with the outer surface of the polyurethane layer and a diameter of about one-thirty seconds inch is used for the perforations.

Figure 21:
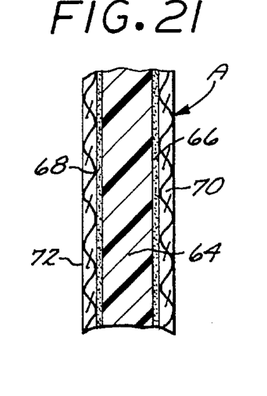
FIG. 21 is a broken sectional view taken in enlarged scale along line 21—21 of FIG. 20.
Figure 22:
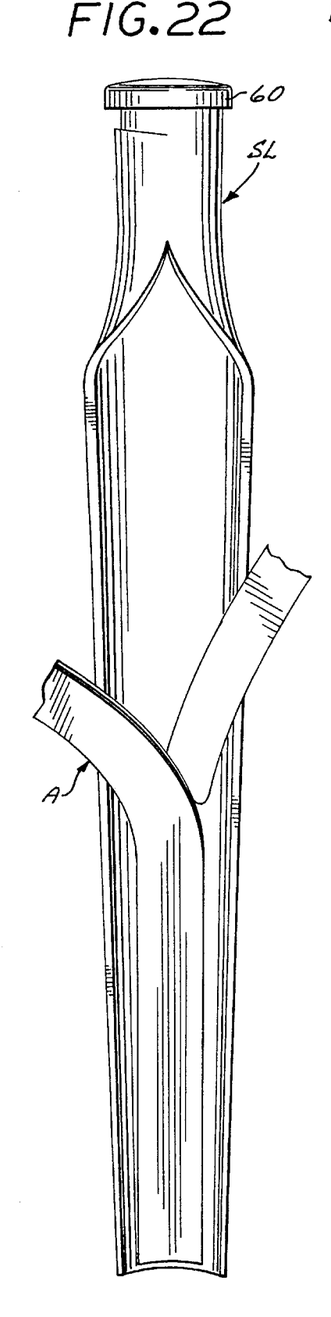
FIG. 22 is a side elevational view showing the adhesive carrier being applied to the sleeve.

Referring now to FIGS. 14–22, there is shown sleeve SL member of the golf club grip embodying the present invention. Such sleeve SL may be of unitary synthetic plastic foam or rubber construction utilizing an Integral cap 60 which abuts the upper end of the golf club shaft C. The inner diameter of the sleeve SL should be so selected as to effect a snug fit with the grip receiving portion of the golf club shaft when the sleeve is applied thereto. Referring to FIG. 22, to apply the adhesive carrier A to the interior of sleeve SL, the protective tape 70 is peeled off adhesive 66 and the adhesive carrier body 64 is pressed onto the interior of the sleeve. One side of the sleeve SL is formed with a longitudinally extending slit 62, shown particularly in FIGS. 15 and 18. It is important to note that the sleeve is affixed to the golf club shaft utilizing an elongated, flat adhesive carrier A shown in FIGS. 18–21. The inner surface of adhesive carrier A includes a body 64 coated with a suitable adhesive 66 on its inner surface. Body 64 is coated on its outer surface with the same type of adhesive 68. Protective tapes 70 and 72 initially cover adhesives 66 and 68, as shown in FIG. 21.

Figures 16, 17, 18, 19:
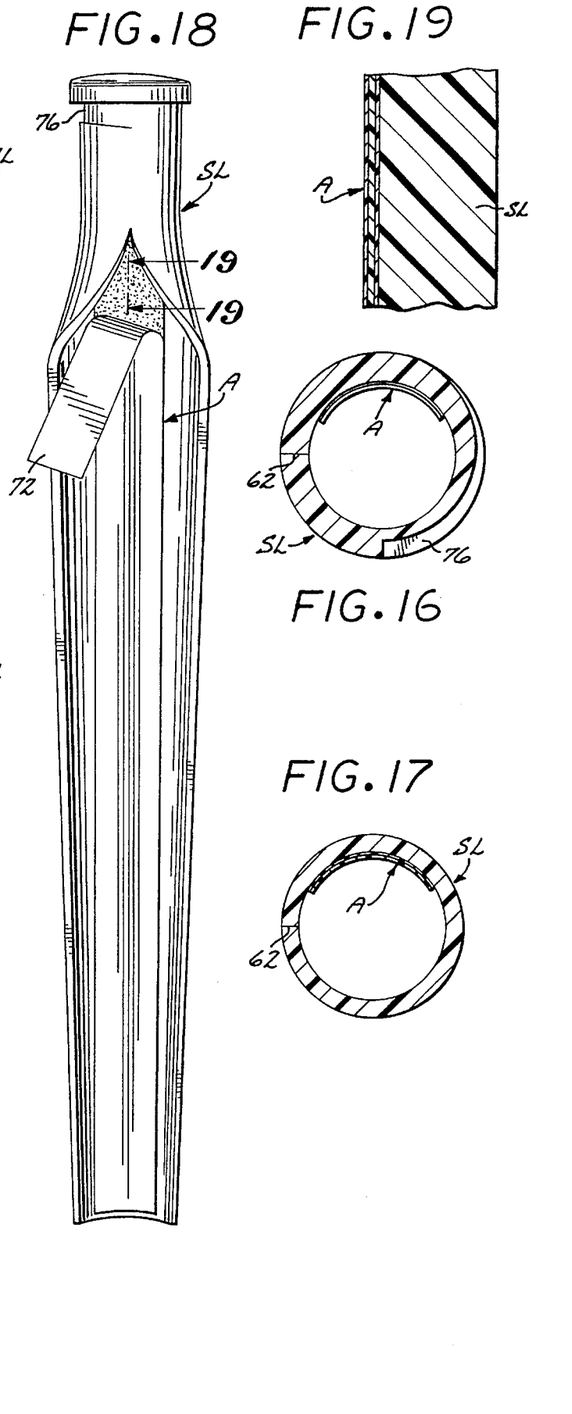
FIG. 16 is a cross-sectional view taken in enlarged scale along line 16—16 of FIG. 14.
FIG. 17 is a cross-sectional view taking in enlarged scale along line 17—17 of FIG. 14.
FIG. 18 is a view similar to FIG. 15 showing an adhesive carrier after it has been applied to the interior of the sleeve.
FIG. 19 is a broken vertical sectional view taken in enlarged scale along line 19—19 of FIG. 18.
Figure 20:
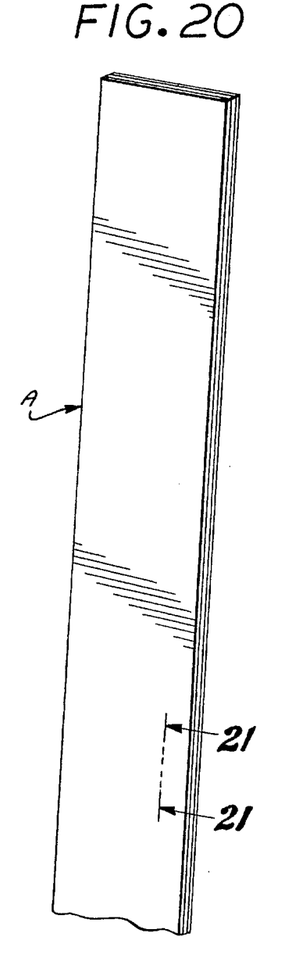
FIG. 20 is a perspective view showing the adhesive carrier.
Figure 23:
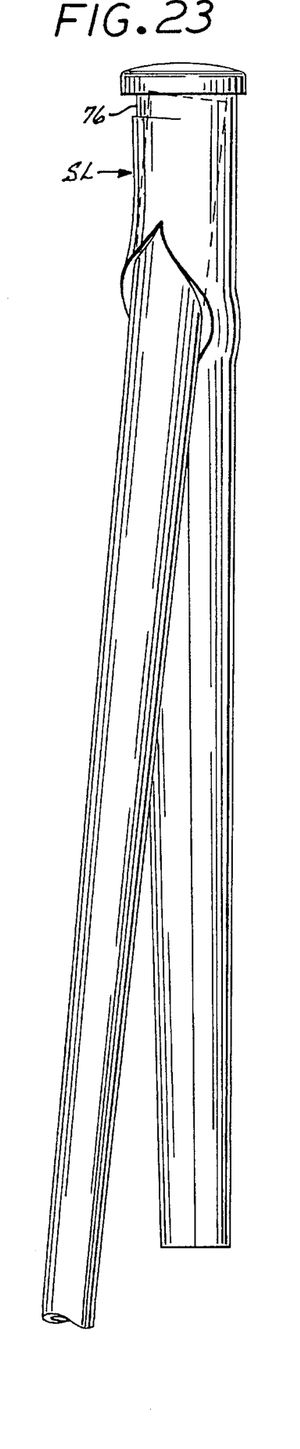
FIG. 23 is a side elevational view showing the first step employed in applying the resilient strip over the sleeve.
Figure 24:
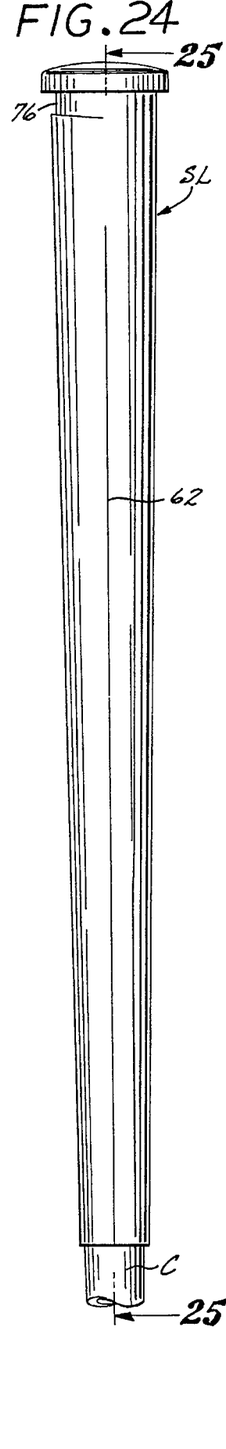
FIG. 24 is a view similar to FIG. 23 showing the sleeve mounted on a golf club shaft.
Figure 25:
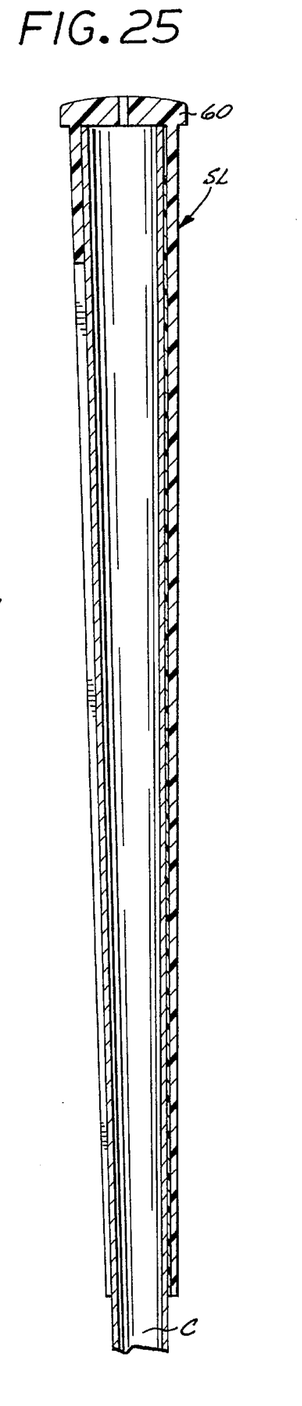
FIG. 25 is a vertical sectional view taken along line 25—25 of FIG. 24.
Figure 26:
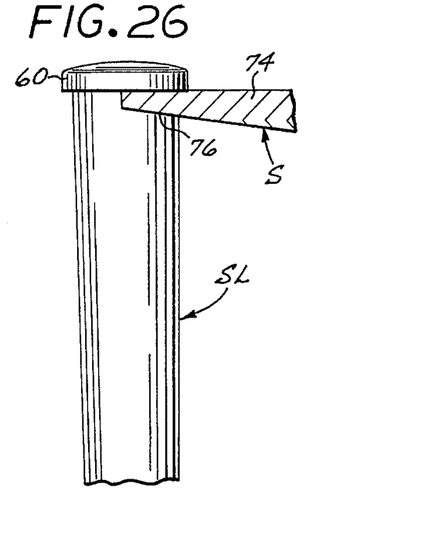
FIG. 26 is a broken side elevational view showing a first step in wrapping the strip around the sleeve.
Figure 27:
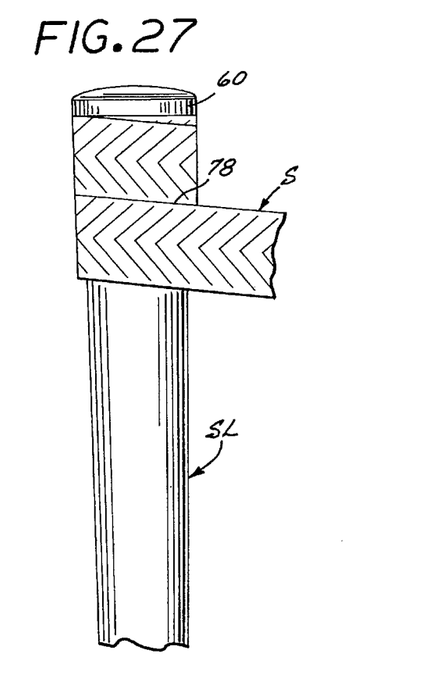
FIG. 27 is a view similar to FIG. 26 showing the strip being wrapped about the sleeve.
Figure 28:
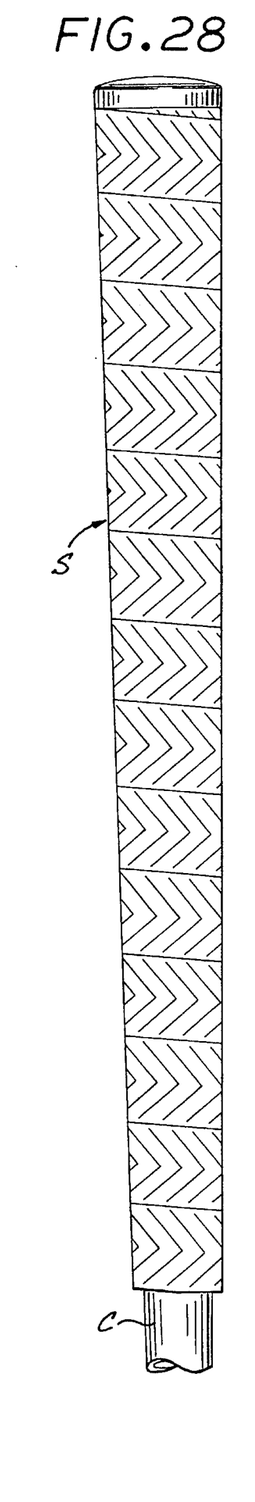
FIG. 28 is a view similar to FIGS. 26 and 27 showing the strip after it has been completely wrapped about the sleeve.
Figure 29:
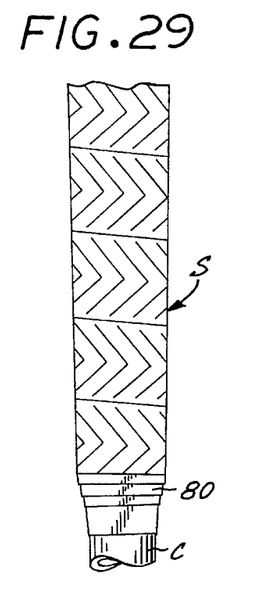
FIG. 29 is a broken side elevational view similar to FIG. 28 showing finishing tape securing the lower end of the wrapped strip to the golf club shaft.
Figure 30:
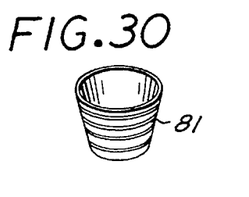
FIG. 30 is a perspective view of a rubber ferrule which is adopted to encircle the lower end of the wrapped strip.

To apply the sleeve SL to the upper end of the golf club shaft C the protective tape 72 is first peeled off the adhesive layer of 68 of adhesive carrier A, as indicated in FIG. 18. Thereafter, the upper end of the golf club shaft is manipulated into the confines of the sleeve SL by separating the sleeve along its slit 62, as shown in FIG. 23. The appearance of the sleeve as applied to the golf club shaft is shown in FIG. 24. The next step is to wrap the strip S over the sleeve SL. This accomplished by first removing the protective tape 50 from the under side of the strip S, as shown in FIG. 2. Thereafter, the beveled upper end 74 of the strip S is adhered to the upper end of the sleeve SL below the underside of the sleeve's cap 60. It should be noted that the upper end 74 of sleeve SL is formed with an indentation 76 to receive the beveled upper end 74 of strip S. The remainder of the length of the strip S is then spirally wrapped about the sleeve SL with the edges of the strip S in tight abutment as indicated at 78 in FIG. 27. The appearance of the strip after it has been completely wrapped about sleeve SL is shown in FIG. 28. Referring now to FIG. 29, the lower portion of the strip will then be affixed to the golf club shaft C by spirally wrapping finishing tape 80 thereover. Preferably, the finishing tape 80 is then covered by a frusto-conical protective rubber ferrule 81 shown in FIG. 30. The rubber ferrule 81 is expanded so as to slide over the spirally wound strip S and moved downwardly to its final position shown in FIG. 31. It should be noted that although the side edges of the strip S are shown as being in tight abutment, it would also be possible to skive the edges of the strip and overlap such skived edges. Utilizing the butted-together edges shown in the drawings, however, increases the durability of the completed grip since the strip remains the same height across the width of the strip. Also, it is easier to install the strip with butted-together edges since it is not necessary to exert as much tensile strength on the strip when utilizing an abuting arrangement as when utilizing an over-lapped edge arrangement.

It should also be noted that although the longitudinal profile of the sleeve SL may be the same as the longitudinal profile of the upper portion of the golf club shaft it is also possible to utilize a longitudinal sleeve profile different from that of the golf club shaft profile. The profile of the sleeve and hence of the grip after the strip has been wrapped around the sleeve may assume a desired configuration corresponding to size and shape of the golfer's hands to thereby provide maximum comfort and further enhance control over the golf club during play.

Figure 34:
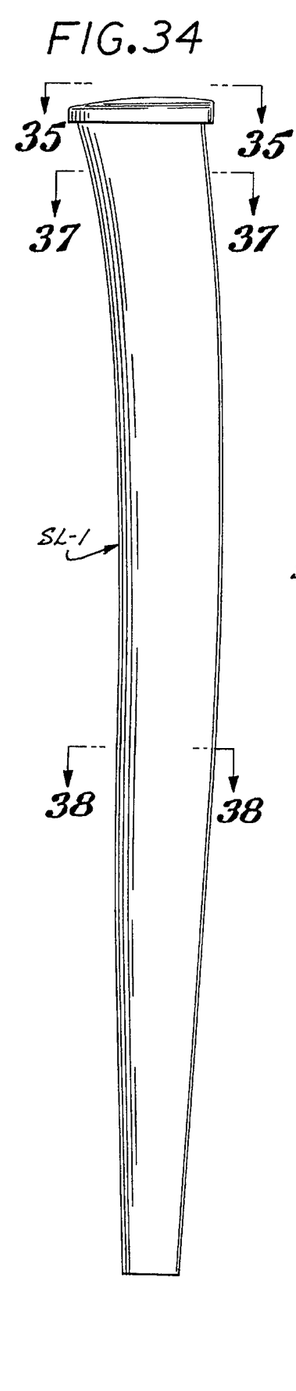
FIG. 34 is a side elevational view of a sleeve utilized in forming a grip for a putter.
Figure 35:
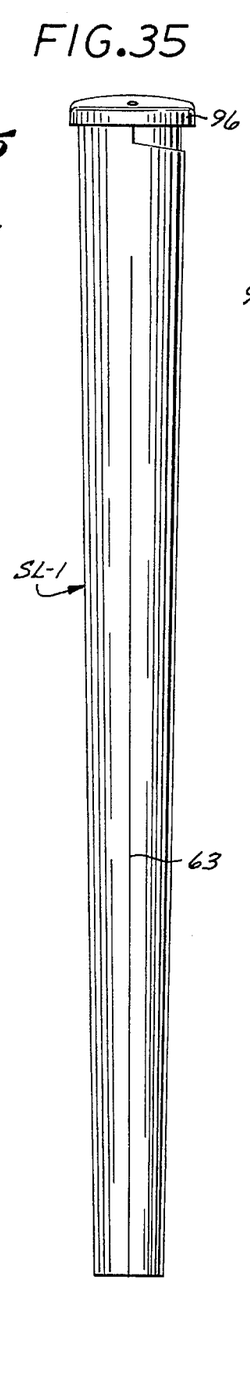
FIG. 35 is a view similar to FIG. 34 showing the sleeve rotated about its vertical axis 90 degrees from its position of FIG. 34.
Figure 36:
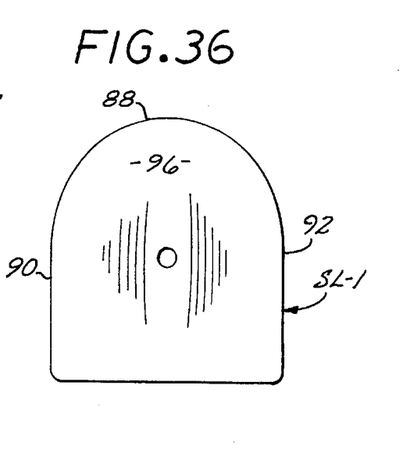
FIG. 36 is a horizontal view taken in enlarged scale along line 36—36 of FIG. 34.
Figure 37:
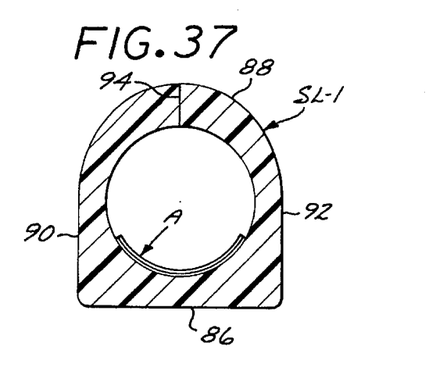
FIG. 37 is a horizontal sectional view taken in enlarged scale along line 37—37 of FIG. 34.
Figure 38:
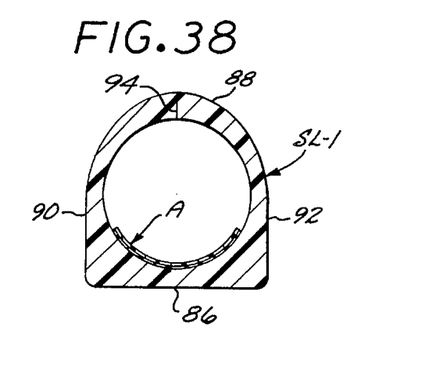
FIG. 38 is a horizontal view taken in enlarged scale along line 38—38 of FIG. 34.
Figure 39:
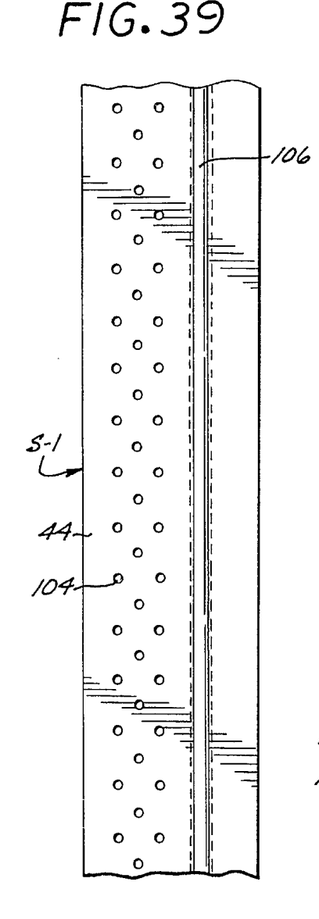
FIG. 39 is a broken top plan view of another form of resilient strip utilized in making a golf club grip of the present invention.

Referring now to FIGS. 34–38 there is shown a form of the sleeve SL-1 of the present invention utilized to form a grip (not shown) adapted for use on golf club putter. In this construction, the resilient, split sleeve SL-1 is provided with a horizontal profile which affords a more controlled grasp of the golf club by the golfer, as compared to the conventional annular horizontal profile employed in golf club putters. Thus, sleeve SL-1 is shown provided with a flat surface 86 and annular surface 88 disposed oppositely to the flat surface 86, with the outer portions of the flat and annular surfaces being connected by straight side surfaces 90 and 92. The front of the sleeve is formed with a longitudinal slit 94 to permit application of the sleeve SL-1 about a golf club shaft (not shown). The upper end of the sleeve is provided with integral cap 96. In all other respects, the construction of the sleeve SL-1, the adhesive carrier A and the wrapping of the elongated, cushioned strip about the sleeve generally corresponds to the construction and installation steps described before herein with respect to FIGS. 1–33. Preferably, the side profile of sleeve SL-1 will have a pistol-like configuration, as shown in FIG. 34.

Figure 40:
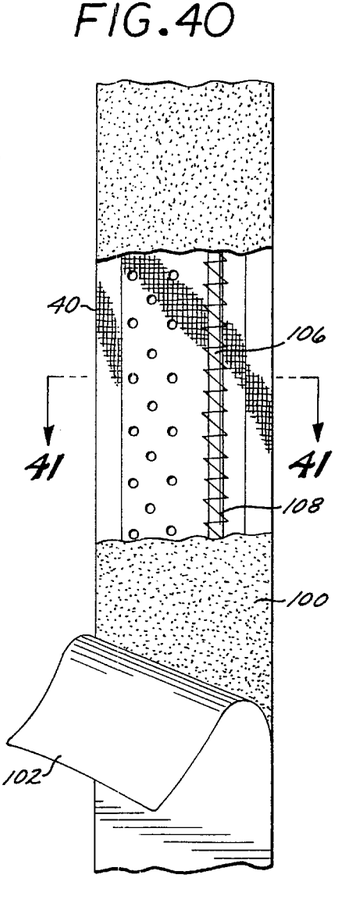
FIG. 40 is a view of the under side of the strip of FIG. 39.
Figures 41, 42:
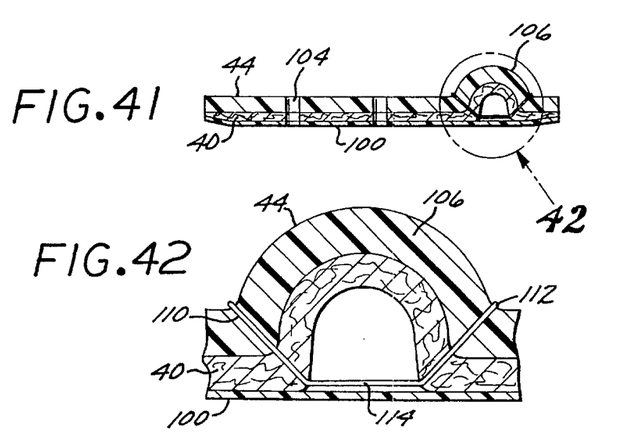
FIG. 41 is a cross sectional view taken in enlarged scale along lines 41—41 of FIG.
FIG. 42 is a further enlarged view of the encircled area designated 42 in FIG. 1.

Referring now to FIGS. 39–43 there is shown another form of golf club grip G-1 embodying the present invention. Golf club grip G-1 utilizes an elongated resilient strip S-1 which may be employed with the sleeve SL and adhesive carrier A shown and described hereinbefore to provide golf club grip G-1 shown in FIG. 43. Strip S-1 includes an open pored textile layer 40, the upper surface of which is bonded to the lower surface of a polyurethane layer 44 formed as described hereinbefore. The underside of the strip S-1 is provided with an adhesive 100 which is initially covered by a protective tape 102. The adhesive 100 extends across the entire width of the textile layer 40. It should be understood that the protective tape 102 is stripped off the adhesive 100, as indicated in FIG. 40 when the strip S-1 is to be spirally wrapped about the grip receiving portion of the shank of a golf club. The strip S-1 is preferably provided with a plurality of perforations 104 that extend through the polyurethane and felt layers. The provision of these perforations increases moisture absorption and allows for faster drying of the golf club grip while further enhancing the cushioning effect of the golf club grip by providing a controlled restriction of air escaping from within the pores of the textile layer when the golf club grip is grasped by the golfer. The strip S-1 is also formed with a raised arcuate protrusion 106 along its length. This profile 106 is defined by suitable thread 108 preferably made of polyester. Referring to these FIGS. 40, 41 and 42, the annular protrusion 106 is created by three segments of thread 108. Two segments 110 and 112 are on the bottom and left hand sides of the protrusion, and one middle segment 114 is on the bottom side of the protrusion. Middle thread segment 114 connects the other two thread segments 110 & 112, and controls the height of the annular protrusion 106, the tighter the middle thread segment 114, the higher the protrusion. The thread 108 passes through the felt and polyurethane layers in a zig-zag pattern, as shown in FIG. 40.

Figure 43:
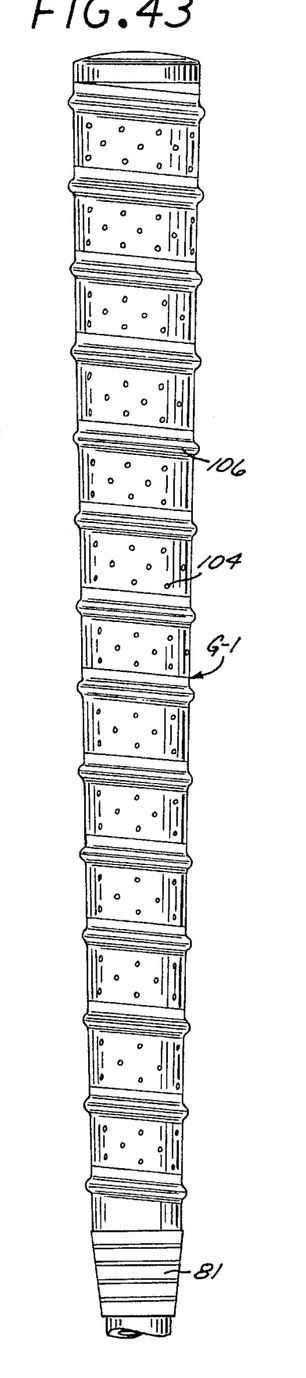
FIG. 43 is a side elevational view of a golf club grip utilizing the resilient strip of FIGS. 39–42.

Referring now to FIG. 43 when the strip S-1 has been wrapped about and adhered to a sleeve SL of the type described hereinbefore, the annular protrusion 106 will assume a spiral configuration. The protrusion enhances the cushioning of the golfers hands by the golf club grip G-1 and additionally enhances the golfers grasp of the golf club grip.

It should be noted that the aforedescribed golf club grips embodying the present invention may be utilized as original equipment on a golf club or, alternatively, may be utilized as replacements for an original golf club grip. Installation of the golf club grips of the present invention may be readily accomplished by the average golfer. Accordingly, the golfer is not required to leave his golf clubs at a golf shop for several days in order to have his original golf club grips replaced. Also, the cost of replacing an original golf club grip with a golf club grip embodying the present invention is less than the cost of replacing a conventional grip. Golf club grips embodying the present invention also provide a firm grasp of the grip by the golfer, even when such grip is dampened, as for example, when playing under rainy conditions or by contact with perspiration formed on the golfer's hands. The grip also absorbs more vibration and shock than conventional grips and thereby reduces hand fatigue. Accordingly, the golfer can maintain a better hold on the grip than with conventional grips and can thereby maintain better control of his golf swing. Such control is enhanced by the tackiness inherent to the polyurethane layer of the grip. Also, golf club grips embodying the present invention enhance the player's feel and control during a swing by eliminating the need to wear a glove which protects against skin abrasion. The grip of the present invention is lighter in weight than conventional grips. Accordingly, more weight is distributed to the club head thereby increasing club head speed without increasing the weight of the golf clubs. The aforedescribed golf club grips embodying the present invention provide a grip having a longitudinal and/or horizontal profile which may be tailored to the size and shape of an individual golfer's hands so as to further enhance control of the golfer over a golf club.

Various modifications and changes may be made with respect to the foregoing detailed description without departing from the spirit of the claimed invention.

What is claimed is:

1. A golf club grip kit for a golf club shaft, said kit comprising:

a resilient sleeve;

an elongated adhesive carrier having a body coated on its opposite sides with first and second layers of adhesive, said layers of adhesive originally being covered by first and second protective tapes, with first said protective tape being removed to expose the first adhesive layer to the inside of the sleeve whereby the adhesive carrier body is capable of being adhered to the interior of the sleeve when said protective tapes are removed from said layers of adhesive;

a longitudinal slit formed in the sleeve by means of which the sleeve can be manipulated onto the upper portion of the shaft after the second protective tape is removed from the second adhesive whereby said second adhesive attaches the sleeve to the upper portion of the shaft; and an elongated strip which includes an open-pored textile layer having an inner surface adhered to the outer surface of the sleeve and a smooth closed-pore polyurethane layer having its inner surface bonded to the outer surface of the textile layer remote from the sleeve, with the pores of such polyurethane layer extending generally normal to the longitudinal axis of the sleeve.

2. A golf club grip kit as set forth in claim 1, wherein the side edges of the wrapped strip are in tight abutment on the sleeve.

3. The golf club grip kit of claim 1, for use on a putter shaft wherein the sleeve varies in profile from the profile of the putter shaft whereby when the strip is spirally wrapped about the sleeve, the profile of the grip will conform to the profile defined by the sleeve rather than the profile of the shaft.

4. The golf club grip kit of claim 1, wherein the strip is formed with a raised longitudinal arcuate protrusion along its length, with such arcuate protrusion defining a spiral pattern when the strip is spirally wrapped about and adhered to the outer surface of the sleeve.

5. The golf club kit of claim 1, wherein the polyurethane layer is formed with treads.

6. The golf club grip kit of claim 1, wherein the polyurethane layer is formed with dimples.

7. The golf club grip kit of claim 1, wherein the polyurethane layer is formed with perforations.

8. A golf club grip kit for a golf club shaft, said kit comprising:

a resilient sleeve integrally formed at its upper portion with a cap and with an indentation below said cap;

an elongated adhesive carrier having a body coated on its opposite sides with first and second layers of adhesive;

first and second protective tapes covering said layers of adhesive and being removable to expose said layers of adhesive;

a longitudinally extending slit formed in said sleeve which is opened to admit the upper portion of a golf club shaft, with said first adhesive layer being capable of attaching said adhesive carrier body to the interior of said sleeve and the second adhesive layer being capable of attaching the sleeve to the upper portion of a golf club shaft;

an elongated strip having an open-pored textile layer that has an inner surface that abuts the outer surface of the sleeve and a closed-pore polyurethane layer having its inner surface bonded to the outer surface of the textile layer remote from the sleeve, the pores of such polyurethane layer extending generally normal to the longitudinal axis of the sleeve, with the textile layer providing strength to the polyurethane layer and with the strip being spirally wrapped about and adhered to the sleeve; and the upper end of said strip being formed with a beveled upper end received by said sleeve indentation.

9. The golf club grip kit of claim 8 for use on a putter shaft, wherein the sleeve varies in profile from the profile of the putter shaft whereby when the strip is spirally wrapped about the sleeve, the profile of the grip will conform to the profile defined by the sleeve rather than the profile of the shaft.

\* \* \* \* \*